United States Patent
Abuagla et al.

(10) Patent No.: US 12,112,285 B1
(45) Date of Patent: Oct. 8, 2024

(54) SYSTEMS AND METHODS FOR MEASURING EMPLOYEE EXPERIENCE

(71) Applicant: Wells Fargo Bank, N.A., San Francisco, CA (US)

(72) Inventors: Ayat Abuagla, Fremont, CA (US); Naveen Gururaja Yeri, Bangalore (IN); Matt Hord, Denver, NC (US); Jason R Beene, Gaithersburg, MD (US); Christopher M Mahler, Grand Prairie, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 169 days.

(21) Appl. No.: 17/305,425

(22) Filed: Jul. 7, 2021

(51) Int. Cl.
| | |
|---|---|
| G06Q 30/0203 | (2023.01) |
| G06Q 10/063 | (2023.01) |
| G06Q 10/105 | (2023.01) |
| G06Q 10/109 | (2023.01) |
| G06Q 50/00 | (2012.01) |

(52) U.S. Cl.
CPC ......... *G06Q 10/063* (2013.01); *G06Q 10/105* (2013.01); *G06Q 10/109* (2013.01); *G06Q 30/0203* (2013.01); *G06Q 50/01* (2013.01)

(58) Field of Classification Search
CPC .. G06Q 30/0203; G06Q 10/105; G06Q 10/06; G06Q 10/06393
See application file for complete search history.

(56) References Cited

U.S. PATENT DOCUMENTS

| | | | |
|---|---|---|---|
| 10,586,159 B2 | 3/2020 | Baughman et al. | |
| 10,796,217 B2 | 10/2020 | Wu | |
| 11,386,441 B2* | 7/2022 | Magazine | H04L 67/10 |
| 2005/0015362 A1* | 1/2005 | Ostertag | G06Q 10/06311 |
| 2010/0274636 A1* | 10/2010 | Sheridan | G06Q 30/0203 |
| | | | 705/7.32 |
| 2016/0063408 A1* | 3/2016 | Rajaganesan | G06Q 10/0639 |
| | | | 705/7.38 |
| 2018/0005289 A1* | 1/2018 | Angell | G06Q 30/0613 |

(Continued)

FOREIGN PATENT DOCUMENTS

WO  2015004620 A2  1/2015

OTHER PUBLICATIONS

Ramanathan et al. Social Network Observatory for Innovation in Enterprise-Employee Engagement. 2014 IEEE Fourth International Conference on Big Data and Cloud Computing. (Year: 2014).*

(Continued)

*Primary Examiner* — Johnna R Loftis
(74) *Attorney, Agent, or Firm* — K&L Gates LLP (57) ABSTRACT

Systems, apparatuses, methods, and computer program products are disclosed for measuring employee engagement. An example method includes receiving, by communications circuitry, an exogenous event report and identifying, by a frequency modulator and based on the exogenous event report, a frequency at which to deliver an employee survey to an employee. The example method further includes causing, by an engagement engine, delivery of the employee survey to the employee based on the identified frequency and receiving, by communications circuitry, a response to the employee survey. The example method further includes storing the received response in a memory as a measure of employee engagement.

20 Claims, 6 Drawing Sheets

(56) References Cited

U.S. PATENT DOCUMENTS

| | | | |
|---|---|---|---|
| 2019/0172363 A1* | 6/2019 | Arun | G16H 20/70 |
| 2020/0152323 A1 | 5/2020 | Johnstone et al. | |
| 2020/0350074 A1* | 11/2020 | Kim | G16H 15/00 |
| 2020/0364672 A1* | 11/2020 | Cheung | G06Q 10/06 |
| 2021/0035132 A1* | 2/2021 | Kopikare | G06Q 30/0203 |
| 2022/0147900 A1* | 5/2022 | Yan | G06Q 10/06398 |
| 2022/0374956 A1* | 11/2022 | Jungmeisteris | G06Q 30/016 |

OTHER PUBLICATIONS

Thaomas Chamorro-Premuzic and Ian Bailie; Tech Is Transforming People Analytics. Is That a Good Thing? Harvard Business Review, Oct. 21, 2020.

* cited by examiner

SYSTEMS AND METHODS FOR MEASURING EMPLOYEE EXPERIENCE

BACKGROUND

Employee engagement refers to the nature of the relationship between a business and its employees. An "engaged" employee is typically defined as an employee who is happy about his or her place at the company. On the other hand, a "disengaged" employee is typically defined as an employee who has negative feelings about his or her employment with the company. Employee engagement is an important factor to business of all sizes, and it is generally understood that engaged employees are less likely to depart for other employment and are more likely to act in ways that benefit and reflect well upon the business.

BRIEF SUMMARY

Driving greater employee engagement is likely a goal of all well-run businesses. However, to drive employee engagement, one must first have a way to measure that engagement. For small businesses, an owner or operator may be able to measure employee engagement qualitatively and from firsthand exposure to the various employees of the business. For some small businesses and many medium-sized businesses, however, it is often much harder to manually evaluate employee engagement, because a single management stakeholder can no longer simply evaluate engagement firsthand due to the number of employees in the business or because the locations where various employees work prevents firsthand exposure of any individual to all employees of the business. For very large organizations, manually evaluating employee engagement in an ad hoc fashion is generally impossible, because of the problems mentioned above, but also because multiple evaluators would be required, each of whom may interact differently with employees and may draw different conclusions based on their various interactions with employees.

Accordingly, a need exists for a way to measure employee engagement that is systematic, automated, and that also produces consistent, reliable, and actionable insights for an organization's leadership. To evaluate employee engagement in a systematic and automatic way, example embodiments contemplate use of a measurement that is quantitative rather than qualitative. To this end, example embodiments describe the use of a survey to an employee to generate data that can be used to determine the subjective experience of that employee, and thereafter use the experience of the employee as a measure of employee engagement. However, employee engagement will vary over time, so any single data point regarding an employee's experience will be unlikely to produce reliable or actionable insight.

Accordingly, another need exists to measure employee engagement in ways that account for the variability of employee experience. Example embodiments thus contemplate gathering data regarding employee engagement multiple times to enable evaluation of the changes in the attitude of employees over time. Furthermore, the inventors have realized that employee engagement is not just variable over time, but is variable in response to exogenous events. For instance, an employee is likely less engaged when a family member is sick than he or she would otherwise be. Accordingly, example embodiments contemplate the gathering of data regarding employee engagement not just multiple times or on a periodic basis, but in real-time at times when engagement may be affected by exogenous events.

To address these needs and others, systems, apparatuses, methods, and computer program products are disclosed herein for measuring employee engagement. In one example embodiment, a method is provided that includes receiving, by communications circuitry, an exogenous event report, and identifying, by a frequency modulator and based on the exogenous event report, a frequency at which to deliver an employee survey to an employee. The method further includes causing, by an engagement engine, delivery of the employee survey to the employee based on the identified frequency, and receiving, by communications circuitry, a response to the employee survey. In addition, the method includes storing the received response in a memory as a measure of employee engagement. Additional operations are described in detail below as well.

In another example embodiment, an apparatus is provided for measuring employee engagement. The apparatus includes communications circuitry configured to receive an exogenous event report, and a frequency modulator configured to identify, based on the exogenous event report, a frequency at which to deliver an employee survey to an employee. The apparatus further includes an engagement engine configured to cause delivery of the employee survey to the employee based on the identified frequency, wherein the communications circuitry is further configured to receive a response to the employee survey. The apparatus further includes a memory configured to store the received response as a measure of employee engagement.

In another example embodiment, a computer program product is provided for measuring employee engagement. The computer program product includes at least one non-transitory computer-readable storage medium storing software instructions that, when executed, cause an apparatus to receive an exogenous event report, and identify, based on the exogenous event report, a frequency at which to deliver an employee survey to an employee. The software instructions, when executed, further cause the apparatus to cause delivery of the employee survey to the employee based on the identified frequency, receive a response to the employee survey, and store the received response in a memory as a measure of employee engagement.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

It is not possible for large organizations to reliably measure employee engagement using traditional qualitative metrics. Accordingly, a need exists for a quantitative (rather than qualitative) means of measuring employee engagement. In addition, because there is typically no way to ensure that any one measurement of employee engagement is representative, there is a need to secure multiple measurements of employee engagement for each particular employee. Example embodiments described herein address these needs by setting forth a quantitative employee experience metric that can be repeatedly applied as a measure of employee engagement.

Additionally, even when employee engagement is known, responsive action is likely best undertaken at employee mobility triggering points, such as times of sharp change or times of particularly extreme levels of positive or negative employee engagement. For instance, if an employee's engagement dips suddenly, that could signal that the employee will soon start looking for a new job and immediate intervention is the most likely way to avoid attrition. Conversely, if an employee's engagement rises suddenly, that could be indicative of something positive happening in the organization that should be identified immediately and replicated. Times where an employee's engagement moves outside of some predetermined range are similarly important moments for responsive action. Accordingly, to make measurements of employee engagement readily actionable, the measurements of employee engagement should occur at or around these triggering points. Periodic measures of employee engagement may satisfy this need by happenstance, but will miss make important inflection points for many of an organization's employees.

There is thus a need to identify a more flexible cadence for measuring employee engagement that is tailored to the unique circumstances of the various employees of an organization. Such a solution would adjust the timing of outreach to each employee based on the events that are anticipated to have an effect on that employee's engagement.

To address the various specific needs above, example methods, apparatuses, systems, and computer program products are described herein that enable automated, systematic, and actionable measurement of employee engagement through the use of employee surveys. These employee surveys may be delivered via an employee's work device, and may solicit responses that can be tracked and measured over time, both for evaluating the engagement of individual employees over time or for evaluating the engagement of groups of employees in various divisions of an organization. These employee surveys may be delivered, by default, at a baseline frequency that may be predetermined by an administrator. However, the baseline frequencies for survey delivery to each particular employee may be adjusted based on the analysis of the likely impact of various exogenous events (via an exogenous events report) on the experience of that particular employee. Accordingly, the frequency of employee survey delivery can be finely tuned for each employee in an automated and systematic fashion based on the unique circumstances of each employee. By gathering employee engagement information in this fashion, example embodiments are thus able to more reliably identify triggering conditions in the responses to employee surveys that should prompt responsive action.

In contrast to conventional techniques for measuring employee engagement, example embodiments described herein provide systematic, rather than ad hoc, solutions that produce consistent and reliable employee engagement data. Because this systematic solution requires no human involvement, it thus limits the likelihood that human bias will affect the set of employees whose experience will be measured or the frequency with which those employees will be contacted. Moreover, example embodiments do not simply automate manual activity; rather, they introduce a new and different methodology that includes a variable baseline frequency at which each employee is contacted, where the variability is based on the anticipated impact of exogenous events on each employee. Accordingly, example embodiments utilize a technical automated approach that can personalize employee outreach in a way that is simply not possible through manual effort. These enhancements over prior approaches for measuring employee engagement enable enterprises utilizing example embodiments described herein to identify—and prevent—many of the morale issues that lead to employee attrition, as well as identify—and foster—those activities to which employees react favorably. Accordingly, the present disclosure sets forth systems, methods, and apparatuses that are designed to improve the culture of an enterprise.

Although a high level explanation of the operations of example embodiments has been provided above, specific details regarding the configuration of such example embodiments are provided below.

System Architecture

Figure 1:
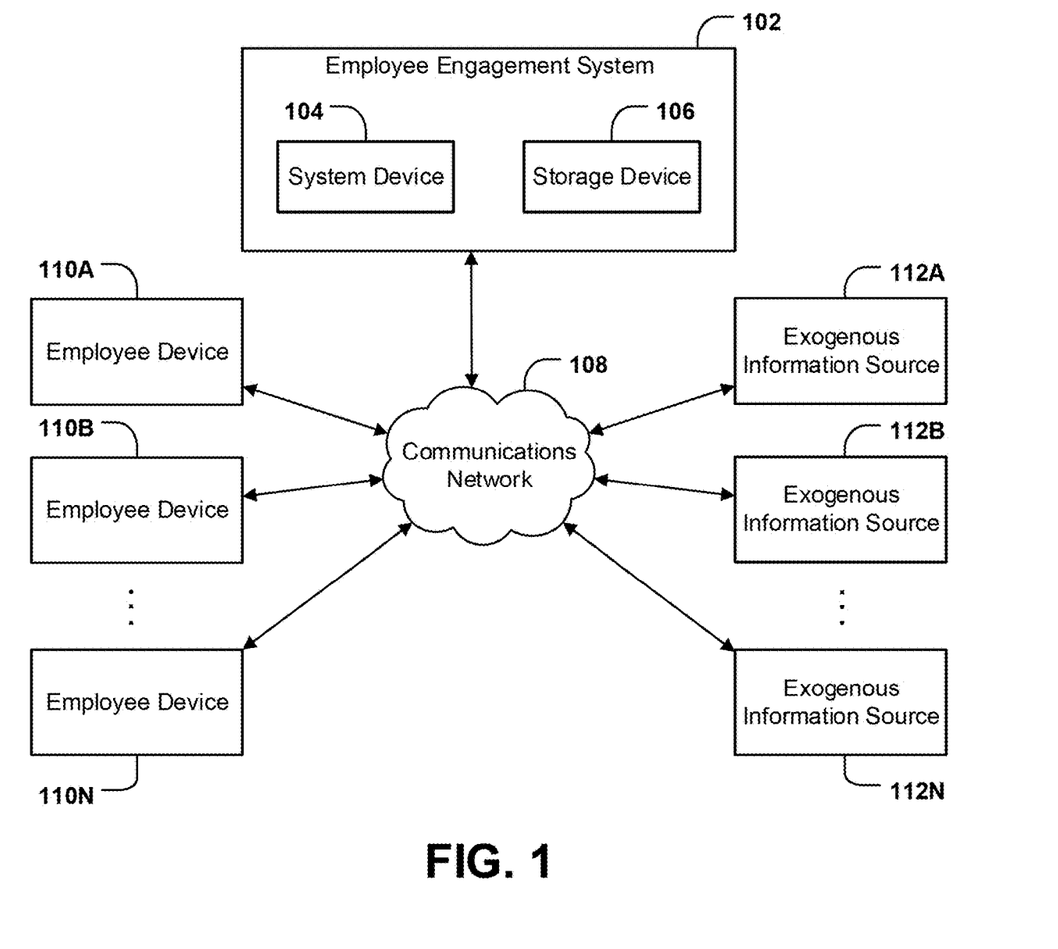
FIG. 1 illustrates a system in which some example embodiments may be used for measuring employee engagement.

Example embodiments described herein may be implemented using any of a variety of computing devices or servers. To this end, FIG. 1 illustrates an example environment within which embodiments of the present disclosure may operate. As illustrated, an employee engagement system 102 may include a system device 104 in communication with a storage device 106. Although system device 104 and storage device 106 are described in singular form, some embodiments may utilize more than one system device 104 and/or more than one storage device 106. Additionally, some embodiments of the employee engagement system 102 may not require a storage device 106 at all. Whatever the implementation, the employee engagement system 102 and its constituent system device(s) 104 and/or storage device (s) 106 may receive and/or transmit information via communications network 108 (e.g., the Internet) with any number of other devices, such as any of employee device 110A, 110B, through 110N and exogenous information source 112A, 112B, through 112N.

System device 104 may be implemented as one or more servers, which may or may not be physically proximate to other components of the employee engagement system 102. Furthermore, some components of system device 104 may be physically proximate to the other components of the employee engagement system 102 while other components are not. System device 104 may receive, process, generate, and transmit data, signals, and electronic information to facilitate the operations of the employee engagement system 102. Particular components of system device 104 are described in greater detail below with reference to apparatus 200 in connection with FIG. 2.

Storage device 106 may comprise a distinct component from system device 104 or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the system device 104 and/or any other elements hosted by the employee engagement system 102. Storage device 106 may store information relied upon during operation of the employee engagement system 102, such as demographic information about the various employees of an organization whose employees are being contacted, or topics of relevance to various employees of the organization. Similarly, the storage device 106 may store a set of baseline frequencies, each baseline frequency indicating the default cadence at which to deliver an employee survey to each employee of the organization. at which or information regarding which employee devices 110A-110N are associated with any given employee (including which device may constitute a primary device of each employee). Storage device 106 may further store software packages that may be executed by the employee engagement system 102 to determine the frequency at which to deliver content to those employees, which may include software operable to determine the relevance of various exogenous events to those employees. In addition, storage device 106 may store control signals, device characteristics, and access credentials enabling access to the employee engagement system 102 by one or more administrators, or for authenticating the identity of the employees interacting with the employee engagement system 102 via any of employee devices 110A-110N.

Each employee will be associated with one or more of the employee devices 110A-110N, and these employee devices 110A-110N may be embodied by any computing devices known in the art, such as desktop or laptop computers, tablet devices, smartphones, or the like.

Exogenous information sources 112A-112N may be embodied by any devices that may transmit information to the employee engagement system 102. For instance, exogenous information sources 112A-112N may comprise personal computing devices known in the art, such as desktop or laptop computers, tablet devices, smartphones, or the like. However, exogenous information sources 112A-112N may alternatively comprise remote information sources reachable via communications network 108, such as web servers or the like. For instance, one or more of the exogenous information sources 112A-112N may be accessible via the Internet and may provide information about a geographic location relevant to an employee (e.g., weather reports or information regarding natural disasters in the area, or updates regarding local news or sports in the area), or about a topic likely to be of interest to an employee (e.g., news about the industry in which the employee works, changes in the stock market, significant political issues, information regarding hobbies that the employee has proactively indicated an interest in, or the like). One or more of the exogenous information sources 112A-112N may be provide information about the employee's employer (e.g., regulatory inquiries, positive or negative mentions in regular or social media, internal information from the employer about likely disrupting activity, such as changes in the volumes of complaints received from employees or from customers, changes in a rate of employee attrition across the enterprise or particular business lines, changes in revenue or profit across the enterprise or in particular areas of the business, or any other such information that may be designated as relevant by the employer whose employees will be contacted by the employee engagement system 102). Similarly, one or more of the exogenous information sources 112A-112N may comprise devices that provide granular information about the employee, such as a device at the employee's worksite that stores information regarding work habits of the employee (e.g., changes in badge-in and badge-out times). In some embodiments, employee devices 110A-110N may be employee devices 110A-110N themselves, from which the employee engagement system 102 may detect changes in activity levels or unusual changes in web browsing behavior, or the like. Accordingly, the set of exogenous information sources 112A-112N may be large and varied, and may comprise devices of all kinds that gather information of any kind that may be deemed by an employer as likely to impact the engagement of one or more of its employees.

As set forth herein, FIG. 1 illustrates an environment and implementation in which the employee engagement system 102 interacts with one or more of employee device 110A-110N, and one or more of exogenous information sources 112A-112N. It will be understood that an administrator or other authorized user may directly interact with the employee engagement system 102 (e.g., via input/output circuitry of system device 104), or may also interact with the employee engagement system 102 via a separate device (not shown in FIG. 1). Accordingly, an administrator may therefore communicate with, operate, control, modify, or otherwise interact with the employee engagement system 102 either directly or via a separate device, but in either case may cause performance of the functions described herein in order to achieve benefits as set forth in this disclosure.

Example Implementing Apparatuses

Figure 2:
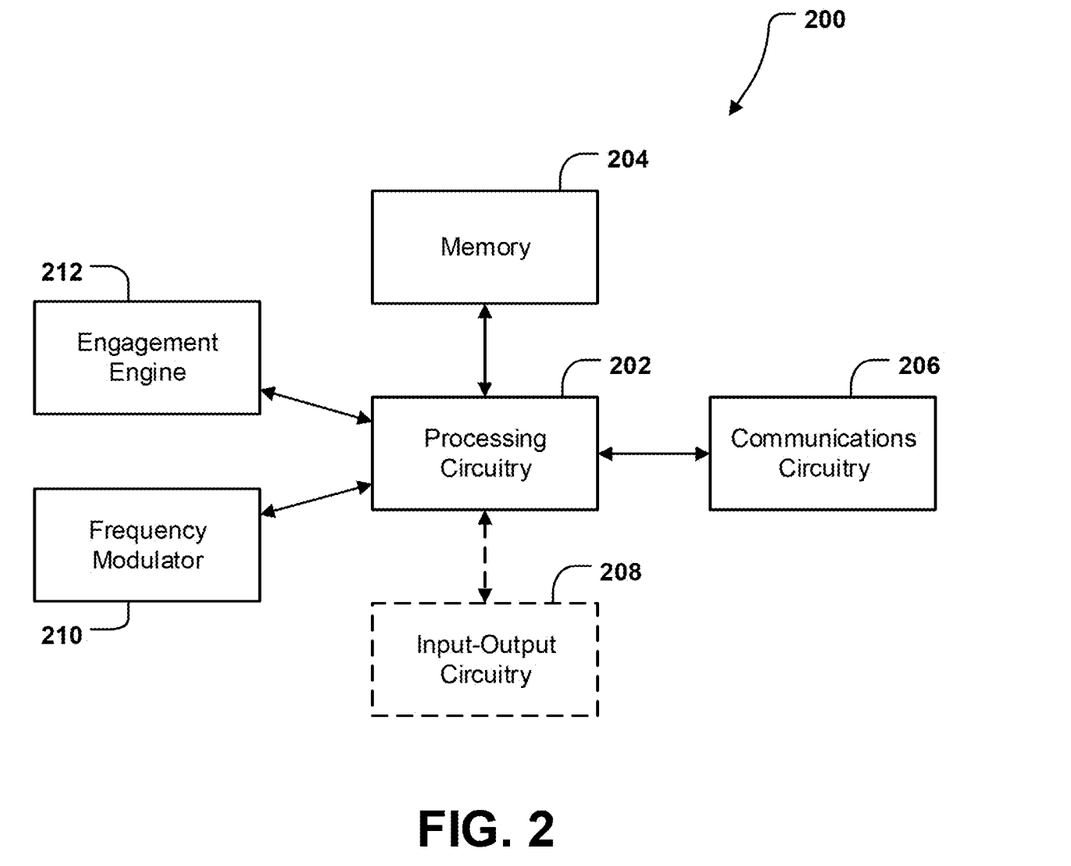
FIG. 2 illustrates a schematic block diagram of example circuitry embodying a device that may perform various operations in accordance with some example embodiments described herein.

System device 104 of the employee engagement system 102 may be embodied by one or more computing devices or servers, shown as apparatus 200 in FIG. 2. As illustrated in FIG. 2, the apparatus 200 may include processor 202, memory 204, communications circuitry 206, input-output circuitry 208, frequency modulator 210, and engagement engine 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-6.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202. Some embodiments of the apparatus 200 may not include input-output circuitry 208, in which case communication between the apparatus 200 and a user may be facilitated by communications circuitry 206 exchanging data with a separate device with which the user interacts, such as any of employee devices 110A-110N (shown in FIG. 1).

In addition, the apparatus 200 further comprises a frequency modulator 210 configured to identify a frequency at which to deliver an employee survey to an employee. As described in connection with FIGS. 5 and 6 below, the frequency modulator 210 may utilize processor 202, memory 204, or any other hardware component included in the apparatus 200 to perform these functions. To perform this operation, the frequency modulator 210 is further configured to determine whether information in an exogenous event report is relevant to the employee and, if so, adjust a baseline frequency for the employee based on the significance of the information relevant to the employee, as described in greater detail below in connection with FIG. 6. The frequency modulator 210 may retrieve the baseline frequency from memory 204 or using communications circuitry 206. The frequency modulator 210 may further utilize communications circuitry 206 to exchange data with a variety of sources (e.g., a storage device 106, as shown in FIG. 1, or an administrator device interacting with the employee engagement system 102), and an administrator may utilize input-output circuitry 208 to exchange data with the frequency modulator 210.

In addition, the apparatus 200 further comprises an engagement engine 212 configured to cause delivery of an employee survey to an employee. The engagement engine 212 may utilize processor 202, memory 204, or any other hardware component included in the apparatus 200 to perform these operations, as described in connection with FIG. 5 below. The engagement engine 212 may further modulate the frequency of engagement based on a baseline frequency identified and/or modulated by the frequency modulator 210. The engagement engine 212 may further utilize communications circuitry 206 to deliver employee surveys to employee devices 110A-110N, receive responses to employee surveys, and exchange other data with employee devices 110A-110N or any other devices, and may utilize input-output circuitry 208 to present data to a user (e.g., an administrator) and/or receive data from a user.

Although components 202-212 are described in part using functional language, it will be understood that the particular implementations necessarily include the use of particular hardware. It should also be understood that certain of these components 202-212 may include similar or common hardware. For example, the frequency modulator 210 and engagement engine 212 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the frequency modulator 210 and engagement engine 212 may leverage processor 202, memory 204, communications circuitry 206, and/or input-output circuitry 208 as described above, it will be understood that each of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the frequency modulator 210 and engagement engine 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the other components describe above as comprising the apparatus 200.

As will be appreciated based on this disclosure, example embodiments contemplated herein may be implemented by apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of an example apparatus 200, example embodiments of the present disclosure are described below in connection with a series of graphical user interfaces and flowcharts.

Automated Interaction with Employees

Although the employee engagement system 102 operates to cause delivery of employee surveys to various employees of an organization, the employee engagement system 102 typically will not itself actually delivery those surveys. Rather, an employee will often interact with a separate employee device (e.g., any of employee devices 110A-110N shown in FIG. 1), which may communicate with the employee engagement system 102 via communications network 108. As described in greater detail below, the graphical user interface (GUI) shown in FIG. 3 may be displayed to the user by the respective employee device. That said, in some embodiments the employee engagement system 102 may deliver an employee survey directly to an employee that employee interacts directly with the employee engagement system 102 (e.g., via input-output circuitry 208 of an apparatus 200 comprising a system device 104 of the employee engagement system 102).

Regardless of which device actually delivers an employee survey to an employee, however, some mechanics of the interaction with the employee will now be described in connection with FIGS. 3 and 4.

Figure 3:
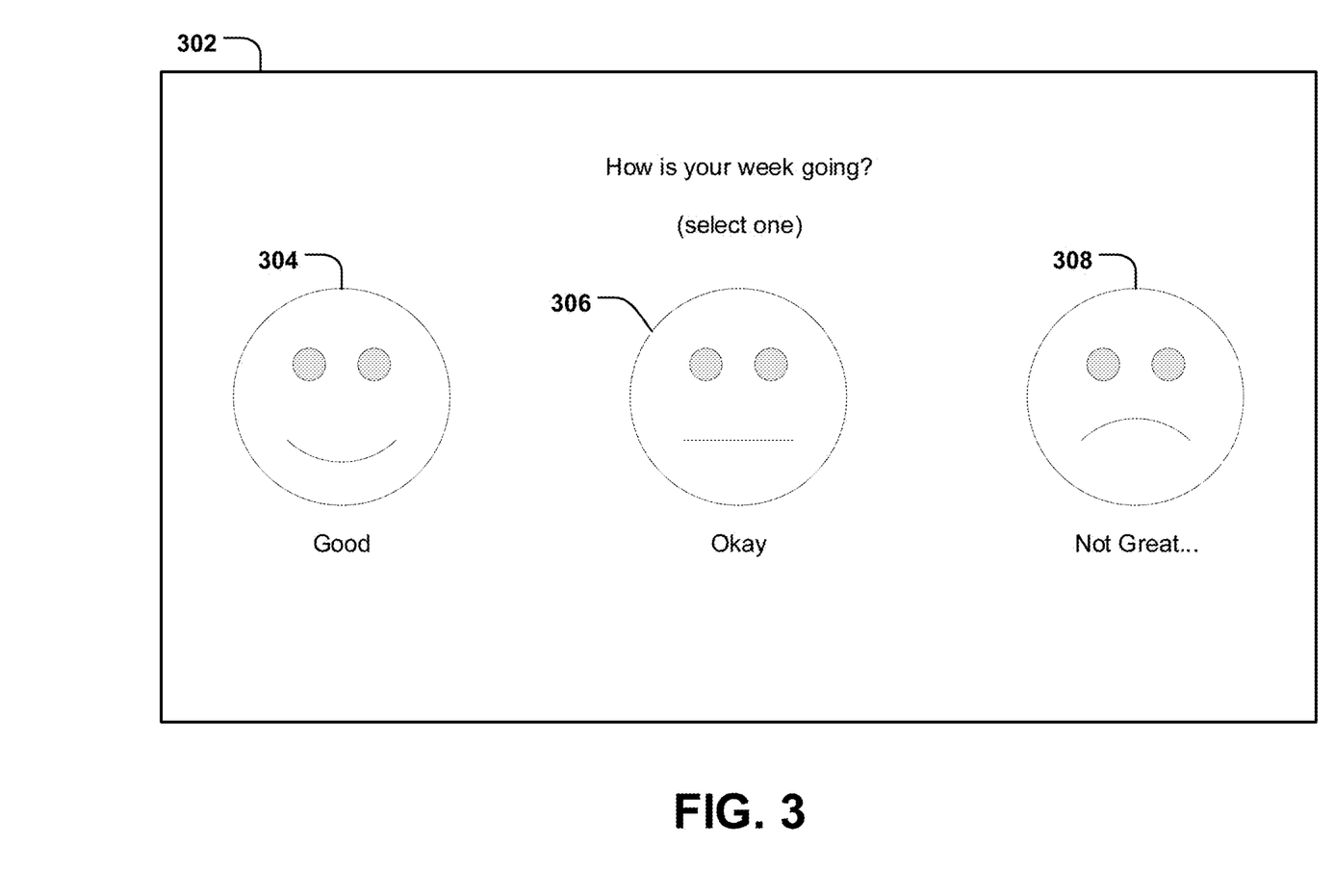
FIG. 3 illustrates an example user interface that may be presented to an employee, in accordance with some example embodiments described herein.

Turning first to FIG. 3, a GUI is depicted that illustrates one example employee survey 302 that the employee engagement system 102 may cause to be presented to an employee. The employee survey 302 may comprise a single interface depicting text (such as the question "How is your week going?") designed to prompt user response. The employee survey 302 may also depict several icons (e.g., an icon 304 with a happy face emoji and the descriptor "Good", an icon 306 with a neutral face emoji and the descriptor "Okay", or an icon 308 with a sad face emoji and the descriptor "Not so great . . . ") that comprise the possible responses that a user may select. The icons may be selectable within the GUI, such that selection of an icon by the user indicates the user's response to the presented text. In the example shown in FIG. 3, the employee survey may comprise a single question, and selection of a responsive icon may complete the survey and allow the GUI to close. The employee survey 302 may be delivered via any number of different communication channels. For instance, the employee survey 302 may be presented as a pop-up window upon initial start-up of a device. As another example, the employee survey 302 may be presented to a user via a messaging application executed by the employee device. In some embodiments, the employee survey 302 may be delivered via a web browser, and may be presented as a landing page upon opening of the web browser. The employee survey 302 may alternatively be delivered by email.

Following receipt of user input indicative of responses to the presented question (or questions, in the case of an employee survey having more than one question), the device presenting the employee survey may forward data indicative of the response back to the employee engagement system 102. As detailed below, the employee engagement system 102 may then store the received response to the employee survey for subsequent use, or may analyze the response and, potentially take responsive action.

Figure 4:
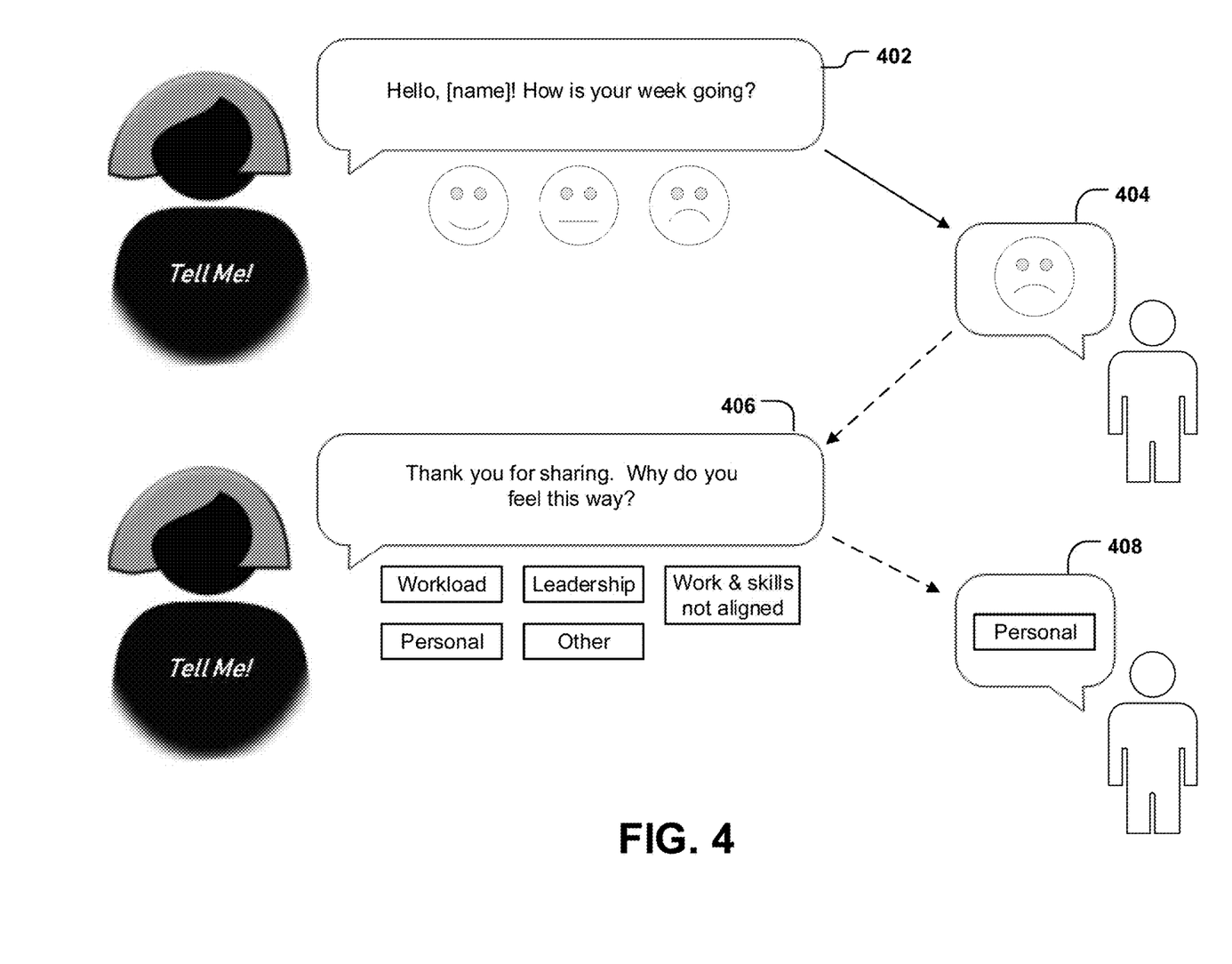
FIG. 4 illustrates an example interaction between an employee and an employee engagement system, in accordance with some example embodiments described herein.

Turning to FIG. 4, an example interaction is illustrated in which an employee survey is delivered to a customer at step 402. In response, a customer provides a response at step 404. These first two steps mirror the interaction described above in connection with to FIG. 3. However, example embodiments may further integrate additional elements into the employee survey. For instance, following receipt of an employee's response to the employee survey, step 406 of FIG. 4 illustrates that the employee engagement system 102 may cause transmission of a follow-up survey question asking for more detail about why the employee responded in that manner. In similar fashion as done in step 404, the employee may respond at step 408 with a selection from the various options presented in the question. Of course, following receipt of the employee's response at step 408, the employee engagement system 102 may cause additional information to be displayed to the employee, or may cause additional questions to be presented for response by the employee. For instance, the employee engagement system 102 may cause transmission of an empathetic message that provides the employee with human resources contacts for further discussion and/or with information about programs offered through the enterprise that address issues relating to the response received from the employee at step 408. A real-time interaction between the employee engagement system 102 and an employee may be most easily facilitated using a chat interface, such as an instant messaging platform or the like, although it could take place via any of the channels of communication described above in connection with FIG. 3

Through the delivery of an employee survey and receipt of responses from an employee as shown in FIGS. 3 and 4, the employee engagement system 102 enables systematic, repeatable, real-time, and objective gathering of data from various employees of an organization, which in turn enables measurement of employee engagement. As will be described below, the frequency with which to deliver employee surveys may vary based on a variety of exogenous factors, and this frequency adjustment brings about additional technical improvements enabling example embodiments to draw better conclusions regarding the engagement of employees of an organization.

Example Operations

Figure 5:
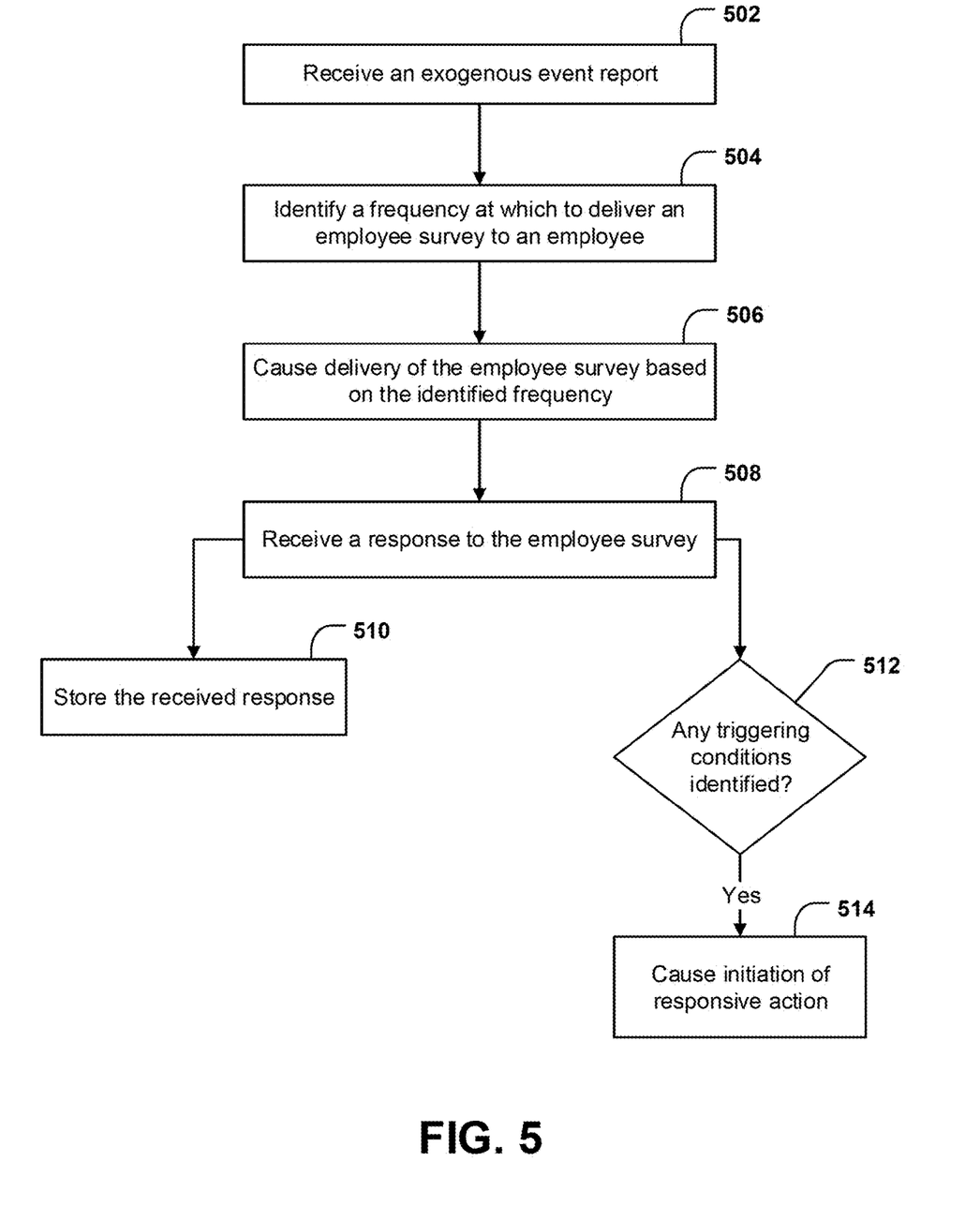
FIG. 5 illustrates an example flowchart for measuring employee engagement, in accordance with some example embodiments described herein.
Figure 6:
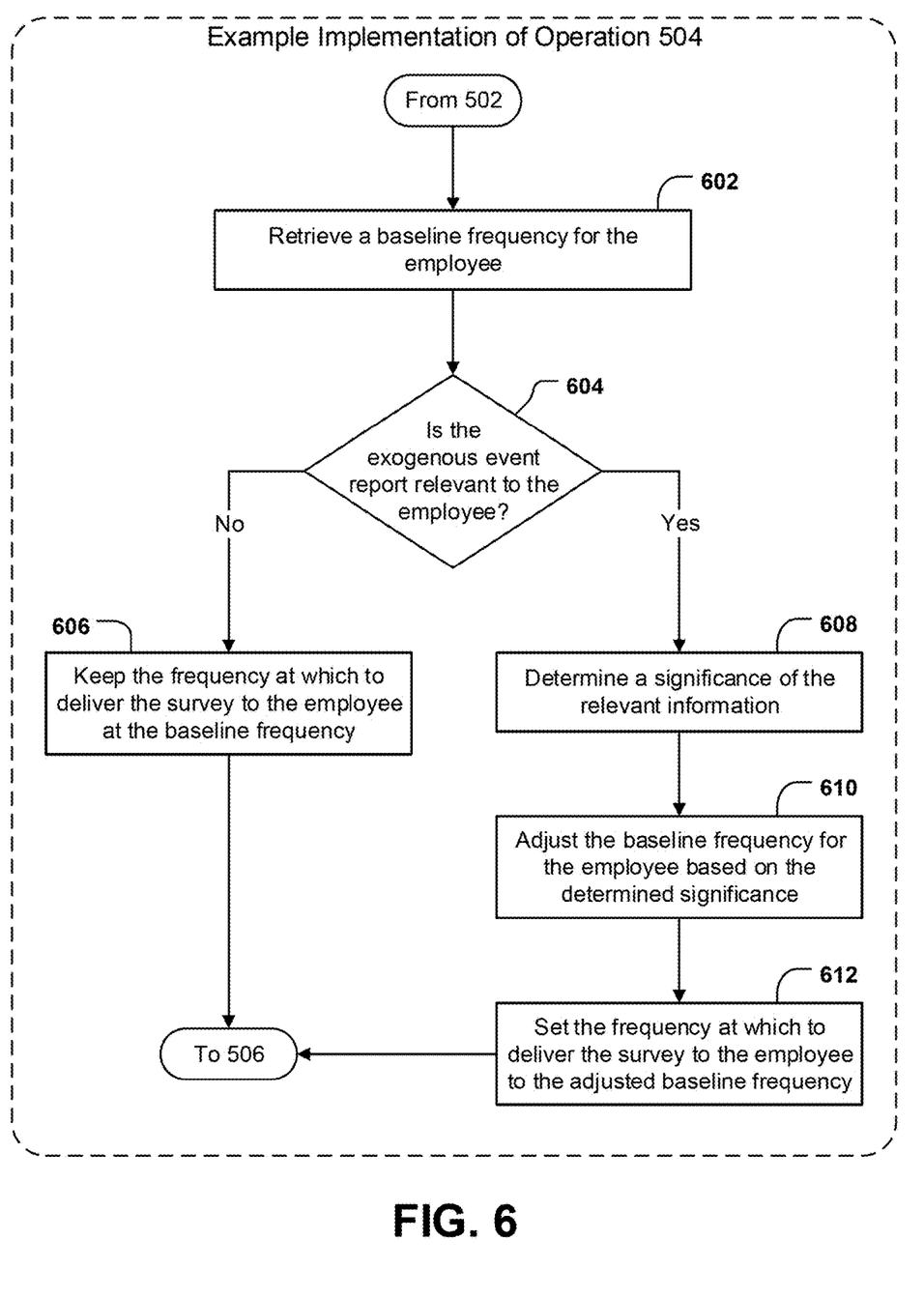
FIG. 6 illustrates another example flowchart for identifying the appropriate frequency at which to deliver an employee survey to an employee, in accordance with some example embodiments described herein.

Turning to FIGS. 5 and 6, flowcharts are illustrated that contains example operations for measuring employee engagement. The operations illustrated in FIGS. 5 and 6 may, for example, be performed by system device 104 of the employee engagement system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, frequency modulator 210, engagement engine 212, and/or any combination thereof. It will be understood that employee interaction with the employee engagement system 102 may in some cases occur directly via input-output circuitry 208, but will be more typically be facilitated by a separate employee device (e.g., one of employee device 110A through 110N, as shown in FIG. 1), which may have communications circuitry and input-output circuitry sufficient to facilitate such user interaction.

Turning first to FIG. 5, example operations are shown for measuring employee engagement.

As shown by operation 502, the apparatus 200 includes means, such as memory 204, communications circuitry 206, input-output circuitry 208, or the like, for receiving an exogenous event report. The exogenous event report may contain information relating to a number of exogenous events that may plausibly affect the employee engagement of any of an organization's employees. For instance, the exogenous event report may comprise a social media report that includes information on recent social media activity that may be of relevance to the employee, a weather report for areas of relevance to the employee, or a news report that may be of relevance to the employee. While these are three particular examples of information that may be included in the exogenous event report, the types of information that may be gathered in the exogenous event report may contain any combination of information that may be predefined by an administrator upon initial setup of the employee engagement system 102. For instance, an administrator may predefine certain types of information, such as company financial information (e.g., revenue, sales, profit, losses, stock performance, or the like) as a type of information that may plausibly affect employee engagement. Additionally, or alternatively, the types of information that are collected for inclusion in the exogenous event report may comprise types of information selected by employees of the organization. For instance, the apparatus 200 may cause delivery, to the employee devices 110A-112N associated with a subset of the employees of an organization, of a request for information about the types of information that the employees believe would be relevant to their employee engagement. Responses received from this request for information may be used by an administrator to design the types of information that will be collated in any given exogenous event report. Responses received from this request for information may alternatively be analyzed by the processor 202 of the apparatus 200, and a set of most-common responses may be selected as the types of information that will be gathered in the exogenous event report.

The exogenous event report may be received as a holistic dataset or may be created by the apparatus 200 after receipt of constituent data elements from other locations. For instance, the exogenous event report may have been previously stored by a storage device 106, which may comprise memory 204 of the apparatus 200 or a separate storage device. In such scenarios, the exogenous event report is simply retrieved from the storage device 106. In another example, the exogenous event report may be provided by a separate device (e.g., an administrator device or an exogenous information source 112A-112N) or may be provided directly by an administrator through manual data entry or via a peripheral device via input-output circuitry 208, in which case the exogenous event report is also simply received by the apparatus 200 for subsequent use.

In some embodiments, however, the apparatus 200 may receive discrete pieces of information that must then be combined to form the exogenous information report. In such cases, the apparatus 200 may gather the various information together to create exogenous event report. A report generation engine of the apparatus 200 (not shown in FIG. 2) may be utilized for this purpose. The report generation engine may leverage the processor 202 to perform this function, or the report generation engine may be a separate physical element of the apparatus 200 distinct from the processor 202. The report generation engine of the apparatus 200 may, therefore, be either a software package executable by the processor 202 or a discrete physical component of the apparatus 200. As one example, information may be received from a storage device 106 or from one or more remote locations (e.g., one or one of exogenous information sources 112A-112N). In another example, information may be provided directly to the apparatus 200 by an administrator of the employee engagement system 102 through manual data entry or from a peripheral device. Of course, information may be received from a combination of these sources and then gathered together by the report generation engine to create the exogenous event report.

To create the exogenous event report from this gathered information, the report generation engine may first identify a period of time within which to gather exogenous information. For instance, exogenous information may be collected for a week, after which the report generation engine may use the gathered exogenous information to create an exogenous event report. Alternatively, the information may be collected continuously and, upon achieving a certain volume of collected data, the report generation engine may use the gathered exogenous information to create an exogenous event report. The period of time and/or threshold volume of collected data may be predefined by an administrator. Either way, upon conclusion of the period of time or upon gathering of the threshold volume of collected data, the report generation engine may determine whether the gathered information falls within one of the types of information previously identified as germane to an exogenous event report (as noted previously, the various types of information that are relevant may be predefined, crowd-sourced from employees, or otherwise provided to the apparatus 200 for use by the report generation engine). The report generation engine may classify each piece of information gathered into a particular information type, and then the report generation engine may create an exogenous event report using only those pieces of information that fall within one of the predefined types of information. The information types of the various pieces of information may in some embodiments be stored as metadata within the exogenous event report to facilitate subsequent identification of the information types of the various pieces of information. In some embodiments, the predefined types of information may be personalized to particular employees based on demographic information (e.g., news regarding topics of interest in which particular employees have a documented interest), in which case an exogenous event report may be created for each employee. In other embodiments, the predefined types of information are generalized to all employees of an organization, in which case a single exogenous event report may be used. Following retrieval of an exogenous event report or creation of one as set forth above, the procedure may thereafter advance to operation 504 for utilization of the exogenous event report.

As shown in operation 504, the apparatus 200 includes means, such as frequency modulator 210 or the like, for identifying a frequency at which to deliver an employee survey to an employee. The frequency at which to deliver the employee survey will be based on the exogenous event report received (or created) in operation 502. A more detailed discussion of this frequency identification process is set forth below in connection with FIG. 6. Following identification of this frequency, the procedure will advance to operation 506.

As shown by operation 506, the apparatus 200 includes means, such as engagement engine 212 or the like, for causing delivery of the employee survey based on the identified frequency. The employee survey may include at least one question soliciting a response from the employee regarding the emotional state of the employee. For instance, as described previously in connection with FIGS. 3 and 4, the employee survey may ask the question "How is your week going?" As described previously in connection with FIGS. 3 and 4, the employee survey may be delivered by an employee device 110A-110N, although in some embodiments the employee survey may be delivered directly by the employee engagement system 102. In the former case, causing delivery of the employee survey utilizes communications circuitry 206 of the apparatus 200, which may transmit the requisite information to the employee device 110A-110N prompting that employee device 110A-110N to present the employee survey to the employee. In the latter case, causing delivery of the employee survey utilizes input-output circuitry 208 of the apparatus 200.

To cause delivery of the employee survey based on the identified frequency, the engagement engine 212 may first identify a primary device used by the employee. Identification of a primary device used by the employee increases the likelihood that the employee survey will be delivered to the device actually being used by the employee, as the employee may at various times utilize more than one employee devices (e.g., a work-provided laptop, a work-provided smartphone, one or more workstations, or the like). The primary device used by the employee may be designated as the employees main computing device (e.g., a work-provided laptop), although in some cases the engagement engine 212 may utilize a more sophisticated analysis that retrieves information regarding the employees login history to identify a device most likely to be the device on which the employee is engaged at the particular time at which the employee survey will be delivered (for instance, if the employee has logged into a particular device at the time at which the survey is to be delivered, the employee survey may be delivered to that particular device).

The engagement engine 212 may also identify an elapsed time since the employee last received an employee survey. The engagement engine 212 may write a data element to a database associated with each employee identifying every time an employee survey is delivered to the employee, and the most recent such data element may be used, in connection with a current day and time, to identify the elapsed time since the employee last received an employee survey. If an employee has never received an employee survey, then the elapsed time may be calculated as the time since the employee joined the organization.

The engagement engine 212 may determine whether the elapsed time is less than the frequency at which to deliver the employee survey to that particular employee. In an instance in which the elapsed time equals or exceeds the frequency at which to deliver the employee survey, the engagement engine 212 may cause the primary device to deliver the employee survey to the employee as set forth previously in connection with FIGS. 3 and 4. However, in an instance in which the elapsed time is less than the frequency at which to deliver the employee survey, the engagement engine 212 may calculated a remaining amount of time by subtracting the elapsed time from the frequency at which to deliver the employee survey, and may then schedule delivery of the employee survey to occur upon passage of the remaining amount of time. To this end, scheduling delivery of the employee survey may comprise transmitting the employee survey to the primary device with an instruction prompting the primary device to deliver the employee survey upon passage of the remaining amount of time, or it may comprise scheduling a task for the engagement engine 212 to repeat the evaluation of whether to cause delivery of the employee survey after passage of the remaining amount of time.

In any event, after causing delivery of the employee survey, operation 508 illustrates that the apparatus 200 includes means, such as communications circuitry 206, input-output circuitry 208, or the like, for receiving a response to the employee survey. The response to the employee survey may include an indicator of the emotional state of the employee. For instance, as described previously in connection with FIGS. 3 and 4, if the employee survey asks the question "How is your week going?", the response to the employee survey may comprise the answer "Good", "Okay", or "Not so great . . . ", and this response may constitute the indicator of the emotional state of the employee. This indicator may be received in numerical form (e.g., "1" for "Good", 2 for "Okay", and 3 for "Not so great . . . "), although in some embodiments the indicator may simply comprise the content of the employee's response, which may subsequently be interpreted and translated by the engagement engine 212 into numerical form when needed. When the primary device that delivers the employee survey comprises a separate device, the response to the employee survey will be received via communications circuitry 206 from that separate device. However, in situations where the primary device that delivers the employee survey comprises the apparatus 200, the response to the employee survey will be received via input-output circuitry 208.

As shown by operation 510, the apparatus 200 includes means, such as memory 204, communications circuitry 206, input-output circuitry 208, or the like, for storing the received response. For instance, the received response may be stored in memory 204 of the apparatus 200 (which may comprise a storage device 106), or the received response may be transmitted, by communications circuitry 206 to a remote storage device for storage. Alternatively, the received response may be stored, via input-output circuitry 208 on a peripheral device attached to the apparatus 200.

As shown by operation 512, the apparatus 200 includes means, such as engagement engine 212 or the like, for identifying whether the received response to the employee survey includes any triggering conditions. These triggering conditions may be predefined by an administrator, and may comprise times of sharp change in employee emotional state as (e.g., an indicator of the emotional state of the employee that is more than a predefined percentage different from the prior indicator of the emotional state of the employee), or times of particularly extreme levels of positive or negative emotional state (e.g., an indicator of the emotional state of the employee that has a value outside an acceptable range). Other specific triggering conditions that may be identified may include a downward trend in emotional state illustrated by the sequence of responses from a particular employee that exceeds predefined criteria. Another triggering condition may comprise a smaller change in emotional state for a particular employee, but which coincides with similar changes in emotional state of other employees (e.g., those reporting to the same manager or working in the same division or line of business, or those working in a similar role in other areas of the enterprise). Another triggering condition may comprise a smaller change in emotional state coupled with a particular exogenous event (e.g., negative mentions of the company in social media, legal challenges lodged against the company, complaints received by the company, or the like). Another triggering condition may comprise a lack of change in indicated emotional state over a series of employee surveys, which may indicate a failure to honestly engage with the employee survey and thus a degradation in the quality of the gathered data.

As shown by operation 514, the apparatus 200 includes means, such as engagement engine 212 or the like, for causing initiation of a responsive action in response to identifying a triggering condition. The responsive action may be tailored to the nature of the triggering condition. For instance, where an indicator of an employee's emotional state changes sharply or falls outside of an acceptable range, the responsive action may comprise an alert to prompt the employee's manager of a human resources employee to reach out personally to the employee to determine what help can be offered (if the emotional state is negative) or to identify whether something the company has done has particular resonance with the employee (if the emotional state is positive). Early intervention in these situations can prevent attrition and/or identify best practices that can be replicated across the enterprise. Where the triggering condition comprises changes in emotional state across groups of employees, senior management can be alerted to the trend so it can be further studied for root cause analysis. For instance, if particular exogenous activity has prompted large-scale changes in the emotional state of a group of employees, responsive action must be directed at a group level, rather than an individual level. Ultimately, by identifying triggering conditions systematically and quantitatively in this fashion, prompt responsive action can begin to address negative issues affecting employee experience, promote morale-improving activities, and reduce the rate of employee attrition.

Turning next to FIG. 6, example operations are shown for identifying the appropriate frequency at which to deliver an employee survey to an employee. As noted previously, the operations set forth in FIG. 6 may be reached following performance of operation 502 of FIG. 5, which has been described previously. The specific operations of FIG. 6 are described in greater detail below.

Turning first to operation 602, the apparatus 200 includes means, such as frequency modulator 210 or the like, for retrieving a baseline frequency for the employee. The baseline frequency may be stored by a storage device 106, which may comprise memory 204 of the apparatus 200, or which may comprise a remote storage device 106 that the apparatus 200 may communicate with via communications circuitry 206. The baseline frequency for each particular employee may comprise a default cadence at which to deliver employee surveys to that particular employee.

As shown by operation 604, the apparatus 200 includes means, such as frequency modulator 210 or the like, for determining whether the exogenous event report is relevant to the employee. To this end, the frequency modulator 210 may first gather demographic and other information about the employee from a storage device 106, which may comprise memory 204 of the apparatus 200. The demographic information may contain information regarding the residence, work location, marital status, and any other information that the employee may voluntarily provide. The other information about the employee may comprise any information about known interests of the employee, such as sports of interest, college or university affiliations, hobbies, or the like. The other information may further include information about an employer of the employee, or information about a geographic locality of the employee (or about the geographic locations otherwise relevant to the employee). The frequency modulator 210 may then identify information types corresponding to the gathered demographic and other information about the employee, either because such data may be stored as metadata in connection with the demographic and other information about the employee in the storage device 106, or by calling a report generation engine to classify the demographic and other information into corresponding information types The frequency modulator 210 may also identify types of the various pieces of information in the exogenous event report, either from metadata stored within the exogenous event report or by calling a report generation engine to classify each piece of information in the exogenous event report into a corresponding information type. Finally, the frequency modulator 210 may compare the information types of the demographic or other information about the employee to the information types of the information in the exogenous event report. The frequency modulator 210 will thereafter identify, as relevant to the employee, any information in the exogenous event report that has an information type that matches an information type in the demographic or other information of the employee.

If no information in the exogenous event report is relevant to the employee, then the procedure may advance to operation 606. However, if one or more piece of information in the exogenous event report is relevant to the employee, then the procedure will advance instead to operation 608.

As shown by operation 606, the apparatus 200 includes means, such as frequency modulator 210 or the like, for keeping the frequency at which to deliver the employee survey to the employee at the baseline frequency. Having thus determined that no change in survey delivery frequency is needed, the procedure may thereafter return to operation 506 for delivery of the employee survey and subsequent operations, as previously described.

However, if one or more piece of information in the exogenous event is relevant to the employee, operations 608, 610, and 612 illustrate further steps that will be taken to identify a new frequency at which to deliver an employee survey to the employee.

As shown by operation 608, the apparatus 200 includes means, such as frequency modulator 210 or the like, for determining a significance of the relevant information in the exogenous event report. To do this, the frequency modulator 210 may first assign a significance score to each piece of information in the exogenous event report that is relevant to the employee. To assign a significance score to each piece of relevant information, the frequency modulator 210 iteratively evaluates each piece of relevant information for hallmarks of significance. For instance, the frequency modulator 210 may reference a predefined significance schedule identifying a number of significance "points" to allocate to information having each particular information type, and may allocate the corresponding number of points to every piece of relevant information based on its corresponding information type. A similar points allocation methodology may be used for other hallmarks of significance of the various pieces of relevant information. For instance, news articles from major news outlets may be awarded more points than news articles from lesser outlets. News articles relating to a work location of the employee may be allocated more points than news articles relating to a residential location of the employee. News articles about severe weather incidents may be allocated more points than news articles about routine weather events. The frequency modulator 210 may thus identify tabulate a number of overall points allocated to each relevant piece of information in the exogenous event report to identify a corresponding significance score for the various relevant pieces of information. Thereafter, the frequency modulator 210 may add together the significance scores for all pieces of information relevant to the employee to create an overall significance score of the exogenous event report to the employee.

As shown by operation 610, the apparatus 200 includes means, such as frequency modulator 210 or the like, for adjusting the baseline frequency for the employee based on the determined significance of the relevant information in the exogenous event report. To this end, frequency modulator 210 may determine a significance tier of the information relevant to the employee based on the significance of the information relevant to the employee. To do this, the frequency modulator 210 may compare the overall significance score of the exogenous event report to a lookup table having predefined information tiers, where a significance score falling within a first and a second value corresponds to a first significance tier, a significance score falling within the second value and a third value corresponds to a second significance tier, and so forth. The frequency modulator 210 may thus identify a significance tier into which the overall significance score falls, and may then select an adjustment value corresponding to the determined significance tier. The adjustment value may comprise a specific amount of time, such as a number of seconds, minutes, hours, days, weeks, or the like. The frequency modulator 210 thereafter may adjust the baseline frequency for the employee by the adjustment value to arrive at a new baseline frequency for the employee.

As shown by operation 612, the apparatus 200 includes means, such as memory 204, communications circuitry 206, input-output circuitry 208, frequency modulator 210, engagement engine 212, or the like, for setting the frequency at which to deliver the survey to the employee to the adjusted baseline frequency. Where the baseline frequency is stored by the memory 204, the frequency modulator 210 may overwrite the baseline frequency stored in the memory 204 with the new baseline frequency. When the baseline frequency is stored remotely from the apparatus 200, the frequency modulator 210 may leverage the communications circuitry 206 to instruct the remote storage location to overwrite the baseline frequency with the new baseline frequency. Having thus identified the appropriate delivery frequency and updated the baseline frequency for the employee accordingly, the procedure may return to operation 506 for delivery of the employee survey and subsequent operations as previously described.

As described above, example embodiments provide methods and apparatuses that enable systematic, rather than ad hoc, solutions for gathering employee engagement data. These solutions address the technical problem of reliably measuring employee morale at scale and at appropriate times. This produces a technical benefit insofar as it enables generation of employee engagement indicators that are reliable, thorough, and consistent, across even the largest organizations. Moreover, the technical solution provides the data necessary for organizations to identify appropriate triggering conditions and take prompt responsive action, thereby improving both the employee experience and avoiding needless employee attrition. The automated approach of the solutions set forth above personalizes employee outreach in a way that is simply not possible through manual effort. Accordingly, the above-described solutions enable enterprises to identify—and prevent—many of the morale issues that lead to employee attrition, as well as identify—and foster—those activities to which employees react most favorably. And in turn, applying the various implementations described herein produces systems, methods, and apparatuses that are designed to improve the culture of an enterprise.

FIGS. 5 and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for measuring employee engagement, the method comprising:
   receiving, by communications circuitry, an exogenous event report;
   identifying, by a frequency modulator and based on the exogenous event report, a frequency at which to present an employee survey to an employee, wherein identifying the frequency at which to present the employee survey to the employee comprises:
      adjusting, by the frequency modulator, a baseline frequency for the employee based on a significance of information in the exogenous event report that is relevant to the employee, and
      setting, by the frequency modulator, the frequency at which to present the employee survey to the employee to the adjusted baseline frequency;
   determining, by an engagement engine and based on an employee login history for a plurality of devices, a device that is most likely to be engaged by the employee at a particular time at which the employee survey is to be presented to the employee according to the adjusted baseline frequency;
   causing, by the engagement engine and based on the adjusted baseline frequency, presentation of the employee survey in real-time upon a start-up of the determined device;
   receiving, by the communications circuitry, a response to the employee survey; and
   storing the received response in a memory as a measure of employee engagement.

2. The method of claim 1, wherein the exogenous event report includes:
   a social media report;
   a weather report; or
   a news report.

3. The method of claim 1, wherein identifying the frequency at which to present the employee survey to the employee includes:
   retrieving, by the frequency modulator, the baseline frequency for the employee;
   determining, by the frequency modulator, whether information in the exogenous event report is relevant to the employee;
   in an instance in which any information in the exogenous event report is relevant to the employee:
      determining, by the frequency modulator, a significance of the information relevant to the employee, and
   in an instance in which no information in the exogenous event report is relevant to the employee, setting, by the frequency modulator, the frequency at which to present the employee survey to the employee at the baseline frequency.

4. The method of claim 3, wherein the information relevant to the employee includes:
   information about the employee;
   information about a known interest of the employee;
   information about an employer of the employee; or information about a geographic locality relevant to the employee.

5. The method of claim 3, wherein determining the significance of the information relevant to the employee includes:
assigning, by the frequency modulator, a significance score to each piece of information in the exogenous event report that is relevant to the employee; and
combining, by the frequency modulator, all assigned significance scores to create an overall significance score of the exogenous event report to the employee.

6. The method of claim 5, further includes:
comparing, by the frequency modulator, the overall significance score to a lookup table to determine a significance tier of the information relevant to the employee; and
selecting, by the frequency modulator, an adjustment value corresponding to the determined significance tier,
wherein the baseline frequency for the employee is adjusted by the adjustment value.

7. The method of claim 1, wherein causing presentation of the employee survey to the employee based on the adjusted baseline frequency includes:
identifying, by the engagement engine, an elapsed time since the employee last received an employee survey;
in an instance in which the elapsed time equals or exceeds the frequency at which to present the employee survey, causing, by the engagement engine, the device to present the employee survey in real-time upon the start-up of the device; and
in an instance in which the elapsed time is less than the frequency at which to present the employee survey:
calculating, by the engagement engine, a remaining amount of time by subtracting the elapsed time from the frequency at which to present the employee survey, and
scheduling, by the engagement engine, the presentation of the employee survey to occur upon passage of the remaining amount of time, wherein the presentation of the employee survey occurs in real-time upon the start-up of the device.

8. The method of claim 1, wherein the employee survey includes:
at least one question soliciting a response from the employee regarding an emotional state of the employee.

9. The method of claim 1, wherein the received response to the employee survey includes:
an indicator of an emotional state of the employee.

10. The method of claim 1, further comprising:
identifying, by the engagement engine, whether the received response to the employee survey includes a triggering condition; and
in an instance in which the received response to the employee survey includes a triggering condition, causing, by the engagement engine, initiation of responsive action.

11. The method of claim 10, wherein the triggering condition comprises one or more of:
an indicator of an emotional state of the employee that has a value outside an acceptable range; or
an indicator of an emotional state of the employee that is more than a predefined percentage different from a prior indicator of the emotional state of the employee.

12. An apparatus for measuring employee engagement, the apparatus comprising:
communications circuitry configured to receive an exogenous event report;
a frequency modulator configured to identify, based on the exogenous event report, a frequency at which to present an employee survey to an employee, wherein the frequency modulator is further configured to:
adjust a baseline frequency for the employee based on a significance of information in the exogenous event report that is relevant to the employee, and
set the frequency at which to present the employee survey to the employee to the adjusted baseline frequency;
an engagement engine configured to determine based on an employee login history for a plurality of devices, a device that is most likely to be engaged by the employee at a particular time at which the employee survey is to be presented to the employee according to the adjusted baseline frequency,
wherein the engagement engine is further configured to cause, based on the adjusted baseline frequency, presentation of the employee survey in real-time upon a start-up of the determined device,
wherein the communications circuitry is further configured to receive a response to the employee survey; and
a memory configured to store the received response as a measure of employee engagement.

13. The apparatus of claim 12, wherein the frequency modulator is configured to identify the frequency at which to present the employee survey to the employee by:
retrieving the baseline frequency for the employee;
determining whether information in the exogenous event report is relevant to the employee;
in an instance in which information in the exogenous event report is relevant to the employee:
setting the frequency at which to present the employee survey to the employee to the adjusted baseline frequency; and
in an instance in which information in the exogenous event report is not relevant to the employee, setting the frequency at which to present the employee survey to the employee at the baseline frequency.

14. The apparatus of claim 13, wherein the frequency modulator is configured to determine the significance of the information relevant to the employee by:
assigning a significance score to each piece of information in the exogenous event report that is relevant to the employee; and
adding the significance scores for all information relevant to the employee to create an overall significance score of the exogenous event report to the employee.

15. The apparatus of claim 14, wherein the frequency modulator is configured to adjust the baseline frequency for the employee based on the significance of the information relevant to the employee by:
comparing the overall significance score to a lookup table to determine a significance tier of the information relevant to the employee; and
selecting an adjustment value corresponding to the determined significance tier,
wherein the baseline frequency for the employee is adjusted by the adjustment value.

16. The apparatus of claim 12, wherein the engagement engine is configured to cause presentation of the employee survey to the employee based on the adjusted baseline frequency by:
identifying an elapsed time since the employee last received an employee survey;

in an instance in which the elapsed time equals or exceeds the frequency at which to present the employee survey, causing the device to present the employee survey in real-time upon the start-up of the device; and in an instance in which the elapsed time is less than the frequency at which to present the employee survey:
calculating a remaining amount of time by subtracting the elapsed time from the frequency at which to present the employee survey, and
scheduling presentation of the employee survey to occur upon passage of the remaining amount of time, wherein the presentation of the employee survey occurs in real-time upon the start-up of the device.

17. The apparatus of claim 12,
wherein the employee survey includes at least one question soliciting a response from the employee regarding an emotional state of the employee, and
wherein the received response to the employee survey includes an indicator of the emotional state of the employee.

18. The apparatus of claim 12, wherein the engagement engine is further configured to:
identify whether the received response to the employee survey includes a triggering condition; and
in an instance in which the received response to the employee survey includes a triggering condition, cause initiation of responsive action.

19. The apparatus of claim 18, wherein the triggering condition comprises one or more of:
an indicator of an emotional state of the employee that has a value outside an acceptable range; or
an indicator of the emotional state of the employee that is more than a predefined percentage different from a prior indicator of the emotional state of the employee.

20. A computer program product for measuring employee engagement, the computer program product comprising at least one non-transitory computer-readable storage medium storing software instructions that, when executed, cause an apparatus to:
receive an exogenous event report;
identify, based on the exogenous event report, a frequency at which to present an employee survey to an employee, wherein identifying the frequency at which to present the employee survey to the employee comprises:
adjust a baseline frequency for the employee based on a significance of information in the exogenous event report that is relevant to the employee, and
set the frequency at which to present the employee survey to the employee to the adjusted baseline frequency;
determine, based on an employee login history for a plurality of devices, a device that is most likely to be engaged by the employee at a particular time at which the employee survey is to be presented to the employee according to the adjusted baseline frequency;
cause, based on the adjusted baseline frequency, presentation of the employee survey in real-time upon a start-up of the determined device;
receive a response to the employee survey; and
store the received response in a memory as a measure of employee engagement.

* * * * *